April 11, 1950     O. J. POUPITCH     2,504,087
ADJUSTABLE STUD FASTENER
Filed Feb. 14, 1945
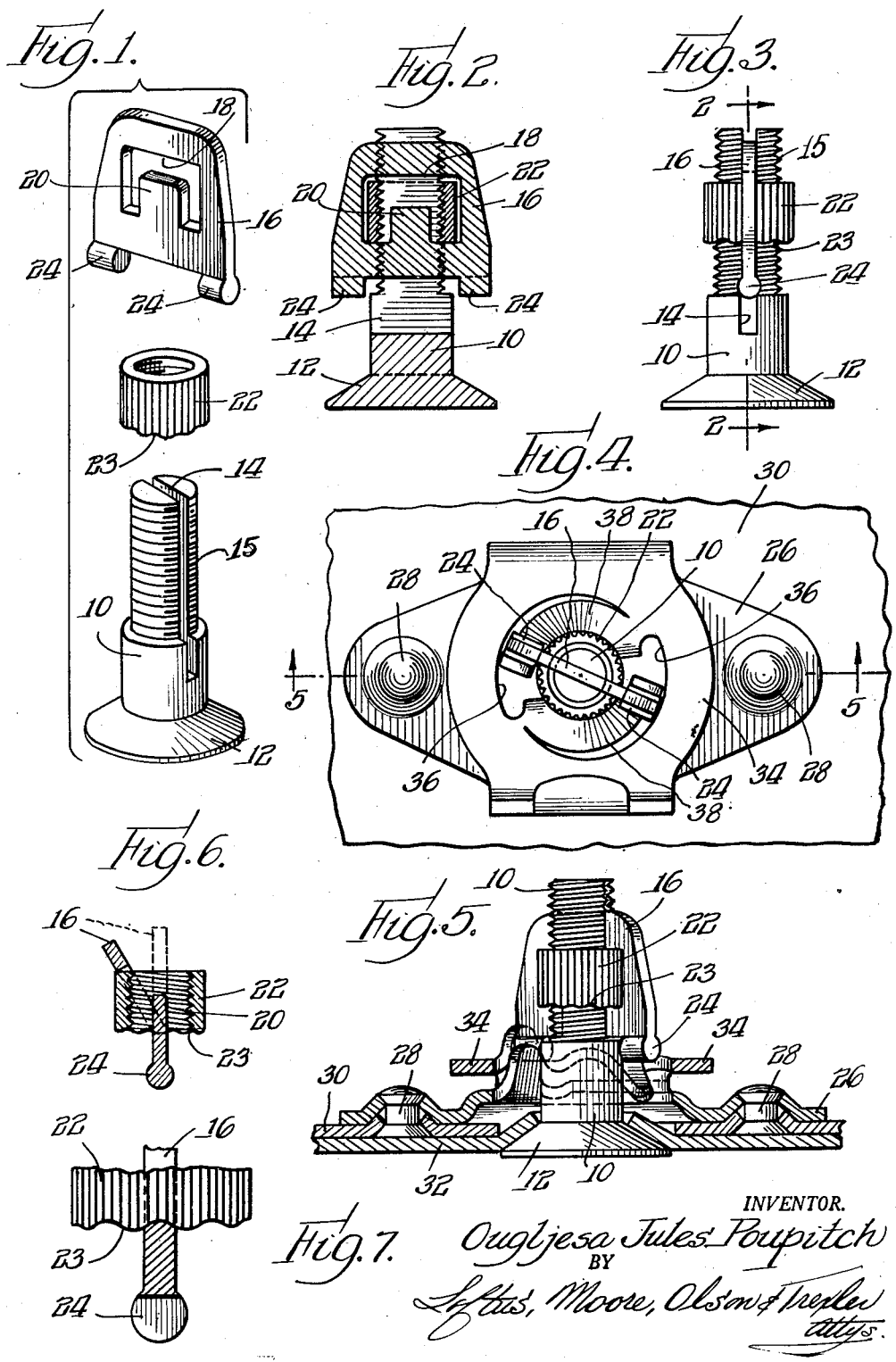
INVENTOR.
Ougljesa Jules Poupitch Patented Apr. 11, 1950

2,504,087

UNITED STATES PATENT OFFICE 2,504,087

ADJUSTABLE STUD FASTENER

Ougljesa Jules Poupitch, Chicago, Ill., assignor to Illinois Tool Works, Chicago, Ill., a corporation of Illinois Application February 14, 1945, Serial No. 577,761

14 Claims. (Cl. 24—221)

1

This invention relates to adjustable stud fasteners of a type particularly adapted for detachably securing in position sheet stock and the like, as, for example the cowlings for airplanes.

It is the principal object of the invention to provide an improved form of quickly operable fasteners of this type having a stud portion which may be adjusted in length so as to enable the fastener to be used to advantage with parts varying in thickness and thus avoid the necessity of maintaining a large stock of fasteners of different sizes for purposes of repair and replacement and at the same time insuring that a strong effective connection of parts to be attached can be made when required.

For accomplishing this object, an improved construction has been provided including improved means for manually effecting the adjustment of the parts for varying the operative length of the stud without the use of a special tool which experience has shown is often not available when an adjustment becomes necessary. The invention also contemplates an improved arrangement for preventing the loosening of the stud under the influence of pressure or vibration, and also a new arrangement of parts whereby a maximum of strength may be attained along with simplicity and ease of manufacture and assembly of the parts.

The foregoing and other objects and advantages will be more readily appreciated from the following detailed description when taken into consideration with the accompanying drawing wherein Figure 1 is a perspective view of the three parts making up the improved device.

Figure 2 is a vertical sectional view taken substantially at the line 2—2 of Figure 3.

Figure 3 is a side view of the device shown in Figure 2.

Figure 4 is a view of one of the improved devices in position in a sheet metal part with a resilient locking plate provided in connection therewith.

Figure 5 is a central vertical sectional view taken substantially at the line 5—5 of Figure 4.

Figure 6 is a vertical sectional view through two of the parts at an intermediate stage in the assembly of the device; and Figure 7 is an enlarged detail showing the co-

2 operation between the parts for preventing loosening of the fastener while in use.

Referring now to the drawing, wherein like numerals have been employed to designate similar parts, 10 indicates a stud or bolt having a head 12 formed integrally therewith at one end and having external screw threads formed on its opposite end portion which is of reduced size, as is best shown in Figure 1. The stud is provided with a deep notch 14 in its threaded end portion 15, such notch extending substantially the full length of the stud.

Within the notch 14, a metal plate or key 16 is slidably mounted, such key being provided with an opening 18 therethrough with a lug 20 extending inwardly at one edge of the opening. Within the opening 18 about the lug 20, a sleeve or collar 22 is mounted having internal screw threads adapted to have operative engagement with the external threads on the stud 10. For mounting the collar 22 in position upon the lug 20, the yoke portion of the plate is bent over as shown in Fig. 6 for enabling the collar to be slipped into position, after which the plate is returned to its normal straightened condition so as to hold the collar rotatably in position in the opening 18 in the plate about the lug 20.

For bringing the parts into fully assembled condition as shown in Fig. 2, the lower cross bar portion of the plate 16 is first inserted into the end of the notch 14 and the collar 22 is brought into engagement with the threaded end portions of the stud 10. As will be readily understood, an appropriate rotary movement of the collar 22 serves to move the plate edgewise along the notch 14 for bringing bearing portions 24 at the edge of the plate 16 into the desired adjusted position with respect to the head 12. As is clearly shown in Fig. 2 the bearing members 24 are in position to move downwardly at opposite faces of the enlarged base portion of the stud 10 so as to be brought into close proximity to the head 12 if desired. For enabling the operator readily to turn the sleeve or collar 22, its outer surface is roughened by being fluted longitudinally.

The improved stud is provided for use at any point and under any conditions but is particularly designed for use in connection with a resilient locking device such as that shown in Figs. 4 and 5. The improved locking device forms no part of the present invention, the locking device as shown being substantially in accordance with the disclosure of my prior Patent No. 2,324,268, granted on July 13, 1943.

The improved resilient locking device comprises a sheet metal plate 26 secured by means of rivets 28 to the face of a plate 30 which it is sought to attach to a plate 32, as shown in Fig. 5. The plate 26 is connected with a cooperating plate portion 34 in spaced relation thereto, the plates 30, 26 and 34 being provided with openings therethrough of a size to receive the stud 10 and with restricted extensions 36 at opposite sides for permitting the plate 16 with its bearing members 24 to pass. The plate 34 comprises obliquely disposed cam portions 38 along which the bearing members 24 are adapted to move as the stud 10 is given a rotary movement through about ninety degrees for carrying the stud 10 upwardly in the arrangement shown in Fig. 5. The construction is such that the camming movement of the bearing portions 24 along the obliquely disposed surfaces 38 serves to tighten the stud securely in position with the parts under tension by reason of the resiliency of the locking plate device. For attaining the desired degree of tensioning of the parts, it is necessary that the effective length of the stud be adjusted to correspond to the thickness of the plates 30 and 32, and the height of the plate 34 above the plate 30.

As will be readily understood, when the plate 16 is pressed upwardly through the action of the locking plate device as above described, the cross bar portion of the plate 16 is brought into effective pressure relationship with the edge of the collar 22. For causing the collar 22 to be held strongly against rotary movement while the parts are under tension, the edge of the collar is notched or undulated at 23, as is best shown in Fig. 7. With the plate engaging the notched edge of the collar, it is practically impossible for the collar to rotate for retracting the bearing portions 24 with respect to the head 12. When, however, the stud is given a reverse rotation through ninety degrees for freeing the bearing portions 24 from operative engagement with the camming surfaces 38, the pressure of the plate upon the edge of the collar is relieved sufficiently for permitting a ready adjustment of the collar 22 along the stud if any such adjustment is desired.

With the plate 32 held in position by a plurality of the studs 10 and cooperating locking plate devices, it is a very easy matter to release the plate for removal, it being necessary only that each of the studs be rotated through ninety degrees for such purpose. In case one of the studs should be lost or damaged, a new stud of the same type can be substituted, it being merely necessary that the effective length of the stud be adjusted by the rotation of the sleeve 22 as above described.

It will be apparent from the foregoing description that the invention contemplates the provision of a stud structure of extremely simple and practical construction. The component parts are small in number and extremely simple to produce. The plate 16 may be stamped from sheet metal stock and this plate precludes the necessity for employing conventional transverse cross pins. In addition to the simplicity of structure, the parts may be assembled with a minimum amount of effort and skill. By having the adjustable collar positioned so that it may be gripped externally for turning, the ease with which adjustment may be made is greatly enhanced. No special tools such as screw-drivers and the like are required to effect an adjustment of the stud, it being only necessary to grip the knurled surface of the adjusting collar. Also by interlocking the bearing members with the structure of the externally threaded stud shank as by means of a key or plate, the device is positively insured against relative rotation between the bearing members and stud when the stud is being applied to or detached from the work.

By arranging the bearing members 24 on the actuating plate or key 16 so as to extend toward the head of the stud beyond the face of the plate, the longitudinal depth of the notch 14 may be substantially reduced without detracting from the ability of the bearing members to approach closely to the head of the stud.

While the form of device as shown and described is preferred, the invention is not to be limited thereto except so far as the claims may be so limited, it being understood that changes might well be made in the form and arrangement of the parts without departing from the invention.

What is claimed is:

1. In a fastening device, the combination of a stud having an externally threaded shank and a head formed integrally therewith at one end, an internally threaded collar on said threaded shank adapted for adjustment longitudinally of said shank, means held against rotary movement with respect to the stud but coupled with said collar for adjustment longitudinally of the stud in opposite directions, and bearing members carried by said longitudinally adjustable means in outwardly extending position at opposite sides of the stud.

2. In a fastening device, the combination of a stud having a head on one end portion and provided with external screw threads at its opposite end portion, a collar engaging the screw threads on the stud so as to be adjustable longitudinally of the stud by relative rotation of the collar and the stud, bearing members extending outwardly at opposite sides of the stud and movable longitudinally for adjustment with respect to the stud, and means adapted by engagement with said stud to hold said bearing members and the stud against relative rotary movement and longitudinally movable as a unit in opposite directions with said collar to secure the bearing members against displacement longitudinally of the stud from a selected adjusted position.

3. In a fastening device, the combination of a stud having a head on one end portion and provided with external screw threads at its opposite end portion and with a longitudinally extending recess along the stud, a collar adjustable longitudinally of said stud by rotation in engagement with the screw threads thereon, bearing members extending outwardly at opposite sides of the stud and movable for adjustment with respect to the stud, and means adapted by engagement with said recess to hold said bearing members from rotary movement with respect to the stud and longitudinally movable as a unit in opposite directions with said collar to secure the bearing members in required position of adjustment.

4. In a fastening device, the combination of a stud having a head on one end portion and provided with external screw threads at its opposite end portion, bearing members mounted so as to extend transversely from the stud at opposite sides thereof and movable longitudinally of the stud, a collar adjustable on said stud by rotation in engagement with the screw threads thereon, and means movable longitudinally of the stud with said collar as a unit in opposite directions adapted upon such longitudinal adjustment to move said bearing members along said stud and adapted to hold the bearings members and the stud against rotary movement with respect to each other.

5. In a fastening device, the combination of a stud having a head on one end portion and provided with external screw threads at its opposite end portion, a plate arranged to move longitudinally of said stud but held against angular movement with respect thereto and having bearing portions extending transversely at opposite sides of the stud, and means comprising a collar adjustable on said stud by rotation in engagement with the screw threads thereon adapted to engage opposite portions of said plate for adjustably positioning said plate longitudinally of the stud in either direction.

6. In a fastening device, the combination of a stud having a head on one end portion and provided with external screw threads at its opposite end portion and with a longitudinally extending recess along the stud, a plate arranged to move longitudinally of said stud but held by sliding engagement with said recess against rotary movement with respect to the stud and having bearing portions extending transversely at opposite sides of the stud, and means comprising a collar adjustable on said stud by rotation in engagement with the screw threads thereon and rotatably coupled with and extending through said plate for holding the plate in adjusted position longitudinally of the stud in either direction.

7. In a fastening device, the combination of a stud having a head on one end portion and provided with external screw threads at its opposite end portion, a plate arranged to move longitudinally of said stud but held against angular movement with respect thereto and having bearing portions extending transversely at opposite sides of the stud, said plate being provided with an opening therethrough having a lug extending inwardly at one edge of the opening, and means comprising a collar rotatably mounted on said lug in said opening in the plate and adjustable on said stud by rotation in engagement with the screw threads thereon so as to cause said plate to move longitudinally of the stud therewith.

8. In a fastening device, the combination of a stud having a head on one end portion and provided with external screw threads at its opposite end portion and having a notch extending longitudinally into the threaded end of the stud, a member movable longitudinally of said stud in said notch comprising bearing portions extending transversely of the stud at opposite sides thereof, and means comprising a collar adjustable on said stud by rotation in engagement with the screw threads thereon and extending within so as to be coupled as a unit with said longitudinally movable member and relatively rotatable with respect thereto for adjusting said bearing portions along said stud.

9. In a fastening device, the combination of a stud having a head on one end portion and provided with external screw threads at its opposite end portion and having a notch extending into the end of the stud, a plate movable edgewise in said notch longitudinally of the stud and comprising bearing members extending transversely of the stud at opposite sides thereof, said plate having a collar receiving opening, and means comprising a collar adjustable on said stud by rotation in engagement with the screw threads thereon and rotatably mounted in said opening in said plate for causing the plate to move longitudinally of the stud with the collar.

10. In a fastening device, the combination of a stud having a head at one end portion and provided with external screw threads at its opposite end portion, a collar engaging the screw threads on the stud so as to be adjustable longitudinally of the stud by relative rotation of the collar and the stud, a member rotatably connected with and housing said collar so as to be movable longitudinally of the stud with the collar as a unit in opposite directions and held by engagement with said stud against rotary movement with respect to the stud, and bearing members carried by said longitudinally movable member and extending beyond said member toward the head of the stud so as to be movable into position at the sides of the stud adjacent to said head.

11. In a fastening device, the combination of a stud having a head on one end portion and provided with external screw threads at its opposite end portion, means movable longitudinally of and secured against rotation with respect to said stud and comprising bearing members extending transversely of the stud at opposite sides thereof, means comprising a collar adjustable on said stud by rotation in engagement with the screw threads on the stud and encompassed by said longitudinally movable means for holding said bearing members firmly against longitudinal adjustment along the stud, and means for holding said collar and stud yieldingly against rotary movement with respect to each other when the stud is in tightened position.

12. In a fastening device, the combination of a stud having a head on one end portion and provided with external screw threads at its opposite end portion, a plate arranged to move longitudinally of said stud but held against angular movement with respect thereto and having bearing portions extending transversely at opposite sides of the stud, said plate being provided with an opening therethrough having a lug extending inwardly at one edge of the opening, means comprising a collar rotatably mounted on said lug in said opening in the plate and adjustable on said stud by rotation in engagement with the screw threads thereon so as to cause said plate to move longitudinally of the stud therewith, and means for holding said collar and stud yieldingly against rotary movement with respect to each other.

13. In a fastening device, the combination of a stud having a head on one end portion and provided with external screw threads at its opposite end portion and having a notch extending into the end of the stud, a plate movable edgewise in said notch longitudinally of the stud and comprising bearing members extending transversely of the stud at opposite sides thereof, said plate having collar receiving opening, and means comprising a collar adjustable on said stud by rotation in engagement with the screw threads thereon and rotatably mounted in the opening in said plate for causing the plate to move longitudinally of the stud with the collar as a unit, and means for holding said collar and stud yieldingly against rotary movement with respect to each other.

14. In a fastening device, the combination of a stud having a head on one end portion and provided with external screw threads at its opposite end portion and having a slot extending into the end of the stud, a plate movable edgewise in said slot longitudinally of the stud and comprising bearing members extending transversely of the stud at opposite sides thereof, said plate having a collar receiving opening, and means comprising a collar adjustable on said stud by rotation in engagement with the screw threads thereon and rotatably mounted in an opening in said plate for causing the plate to move longitudinally of the stud with the collar, one end of the collar engaged by said bearing members being notched so that when the device is tightened in holding position the notched end of the collar engages the edge of the plate.

OUGLJESA JULES POUPITCH.

REFERENCES CITED

The following references are of record in the file of this patent:

UNITED STATES PATENTS

| Number | Name | Date |
|---|---|---|
| 2,084,558 | Holmes | June 22, 1937 |
| 2,095,271 | Swanstrom | Oct. 12, 1937 |
| 2,364,906 | Lumsden | Dec. 12, 1944 |
| 2,385,180 | Allen | Sept. 18, 1945 |